July 26, 1966   H. H. GLASCOCK, JR., ETAL   3,263,115
DISPENSER CATHODE AND METHOD OF MANUFACTURE
Filed May 23, 1962

Inventors:
Homer H. Glascock, Jr.
John M. Houston,
by John P. Dellett
Their Attorney.

United States Patent Office 3,263,115
Patented July 26, 1966

3,263,115
DISPENSER CATHODE AND METHOD OF
MANUFACTURE
Homer H. Glascock, Jr., and John M. Houston, Schenectady, N.Y., assignors to General Electric Company, a corporation of New York
Filed May 23, 1962, Ser. No. 197,129
6 Claims. (Cl. 313—346)

This invention relates to a dispenser cathode and a method of making the same, and more particularly to a dispenser cathode of very small dimension which emits a small and intense electron beam.

Dispenser cathodes for vacuum tubes and the like containing a quantity of electropositive material have the advantage of long life and high electron emission density. In the usual dispenser cathode, applied heat causes the electropositive material to be dispensed from the cathode interior through a porous barrier, forming a monatomic layer upon the cathode surface at a rate substantially equal to the evaporation of such material from the surface. Cathodes of this type are employed in high power transmitting tubes and the like, wherein they present a relatively large emitting surface area and produce a relatively broad and somewhat scattered electron beam. This emission usually takes place not only from the designated emitting area, but also as edge or side emission from the cathode body around the emitting area, the breadth of the emitted beam frequently depending upon the cathode's size. For producing a smaller concentrated electron beam a small cathode would be desirable; however, dispenser cathodes conventionally require bulky heating coils for elevating the cathode to the proper emitting temperature, placing a lower limit on the size of the cathode.

Small-dimensioned electron beams are ordinarily produced with the more common type of directly heated or indirectly heated cathode. The conventional cathode ray tube, for example, includes an indirectly heated cathode at the rearward extremity of the electron gun for producing a narrow stream of electrons. The beam produced in this type of cathode ray tube is suitable for waveform portrayal, television reproduction and the like. However, in many applications an electron beam of yet smaller dimension is required. A small electron beam is required, for example, for "writing" finely detailed charge patterns on a charge receiving surface. The charge pattern may comprise, for example, the lines of a three-color diffraction grating on a deformable light-valve medium employed for the production of three-color television pictures. An apparatus employing such a charge pattern is illustrated and claimed in Patent Number 2,813,146 to William E. Glenn, Jr. dated November 12, 1957. In this type of application, generation of a very small electron beam, on the order of microns, is desired. In order to form such a fine beam it is presently the practice to employ a directly heated cathode comprising a very small "hairpin" filament of tungsten wire producing a small concentrated beam, further narrowed by means of focusing electrodes and the like. This directly heated filamentary cathode requires a high heating current to operate at a relatively high temperature for producing sufficient emission from its small surface. Unfortunately the high temperature, necessary in producing sufficient emission, materially shortens the lifetime of the hairpin filament, and therefore the operating lifetime of the whole cathode ray generating arrangement may be materially shortened.

It is accordingly an object of the present invention to provide an improved dispenser type cathode capable of generating a small dimensioned, high current electron beam.

It is another object of the present invention to provide an improved and efficient long life dispenser cathode for generating a high current density electron beam and especially such a cathode which is substantially resistant to unfavorable gaseous environments found in electron beam writing apparatus and the like.

In accordance with an aspect of the present invention, the dispenser cathode comprises an elongated hollow metallic capsule having a frustrum shaped emitting end and including a deposit of electron emissive material. The elongated and narrow-diameter shape provides a reservoir of emitting material while facilitating ease of manufacture and the generation of a very small diameter electron beam. The very small dispenser cathode, for example, a few mils in diameter, is provided with supporting conductors secured to either side of the dispenser. The conductors, which heat the cathode by conduction and radiation, have cross sectional areas shaped to confine heat to the capsule. Their lateral dimensions are comparable to the dispenser so they largely enclose the dispenser in a heat conserving relationship. Desirably these conductors are secured to separated areas on the side of the dispenser whereby heating current flows entirely through the dispenser resulting in $I^2R$ heating thereof.

In accordance with another aspect of the present invention, the dispenser cathode has a porous metallic electron-emitting forward end which is tapered to a frustrum shape by machining to provide a very small forward primary emitting area whose porosity is undisturbed. The tapered section rearward of the emitting area has a decreased surface porosity caused by the machining which tends to obscure and close the pores in this otherwise porous area. This tapered area is comparatively non-emitting. The electron beam produced by the cathode is small and intense and the cathode life is long. The dispenser cathode, being directly heated, obviates the necessity for a large cathode occasioned by a space consuming heating coil.

In accordance with another aspect of the invention, the dispenser cathode body and emitting surface is tantalum and the emitting material received in the body is thorium. A tantalum emitting surface through which thorium emitting material passes is found to provide an order-of-magniutde greater emission than is secured with other common dispenser cathode materials in high vacuum. Moreover, this cathode, included in combination with an electron beam writing apparatus for depositing electrical charge patterns on a liquid light-modulating medium or a thermoplastic tape material, yields a high emission current density even though its environment is contaminated with a low pressure of vaporized organic materials.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
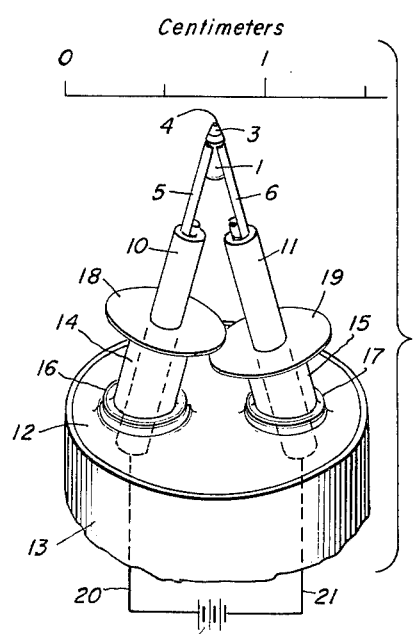
FIG. 1 is a perspective drawing of the dispenser cathode including its support conductors mounted upon an electron gun mounting base.
Figure 2:
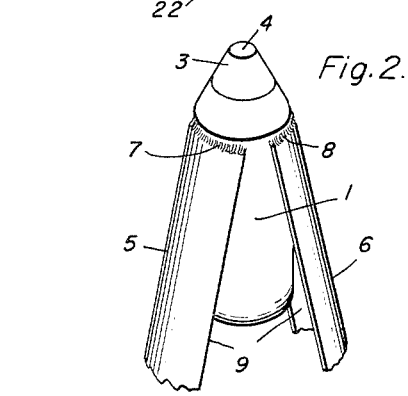
FIG. 2 is an enlarged view of the dispenser cathode with its support conductors.
Figure 3:
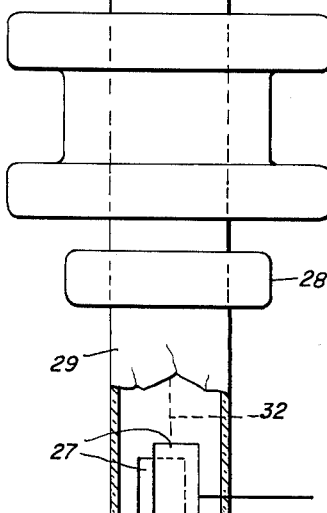
FIG. 3 is an elevational view in section of the dispenser cathode and support conductor of FIG. 2.
Figure 3:
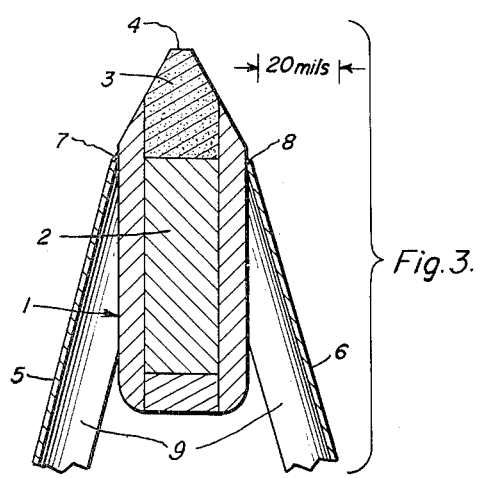

Referring to FIGS. 1, 2 and 3, we have shown our invention embodied in a small dispenser cathode characterized by an extended operating lifetime and which is capable of producing a small and intense electron beam. The dispenser cathode comprises an elongated and small diameter generally cylindrical container body or capsule 1 formed of a refractory metal, e.g., tantalum or tungsten. The body is hollow to form a recess for receiving a deposit of electron emissive material 2, shown in FIG. 3, which is thorium or another electropositive metal. The body is provided at its forward or emitting end with a closure or plug element 3 of porous metal, e.g., sintered tantalum or tungsten, communicating with recess 2. The porous plug is tapered towards a flat emitting area or surface 4 at the top or forward end of the plug, this area providing the emitting surface for the cathode. This tapered or frustrum configuration is accomplished by machining, as hereinafter described, establishing a small emitting area by substantially closing the surface pores of the otherwise porous plug except at the small forward emitting area. The function of the porous plug is to allow passage of electropositive material from the interior of the dispenser cathode body to the emitting surface, 4, where the electropositive material desirably replenishes a monatomic emitting layer as the cathode is heated.

The dispenser cathode body is supported and provided with heating current by means of a pair of refractory metal conducting leads 5 and 6 shaped to confine heat to the capsule. Their lateral dimension or diameter is desirably comparable to the diameter of body 1. These supporting conductor leads are desirably arcuate in cross-section, e.g., semicircular, and are formed from refractory metal foil or ribbon, e.g., tantalum or tungsten. These conducting leads, which may be approximately one mil thick, are brazed or spot welded to the cathode body preferably at separated locations 7 and 8, respectively, to form a good electrical and mechanical connection near the forward end of the cathode body, that is near where the emitting material and plug adjoin. The connection is such as to provide good thermal contact between the leads and the cathode body. The conducting leads 5 and 6 then flair or diverge in skirt fashion in a direction generally rearward of the emitting end of the cathode, forming an A-frame for supporting the cathode. These supporting conductors, being concave with respect to the cathode body, establish a heat-retaining cavity 9 between the conducting leads and the cathode body. This construction also very rigidly positions the capsule.

Conducting leads 5 and 6 are supported in a pair of conducting metal bushings 10 and 11 extending through an insulating ceramic plate 12 on an electron gun support 13. A pair of ceramic spacers 14 and 15 mounted on ceramic bossed portions 16 and 17 support shield discs 18 and 19 the function of which is to shield the ceramic insulating disc 12 from deposition of emitting material. Frequently such deposition is very small and therefore these shields may be omitted is so desired in the interest of space conservation. A pair of electrical connections 20 and 21 join metal bushings 10 and 11 to opposite terminals of a convenient source of power 22 for providing heating current to the dispenser cathode.

In operation, current from source 22 passing through support legs 5 and 6 and through the dispenser cathode including body 1, plug 3, and the material included in the recess 2, acts to heat the dispenser cathode to a sufficient temperature for providing electron emission at the forward emitting surface 4. The emitting material when heated passes through the porous plug 3 establishing a monolayer of atoms of emitting material on small emitting surface 4 to provide a small dimensioned beam of electrons therefrom. The emitting material does not pass through the machined tapered surface surrounding the emitting surface 4 because the machining substantially closes the pores on the surface portion whereby the tapered area is substantially less porous than emitting surface 4. Moreover the cathode body is elongated away from the emitting area.

Current passing through the dispenser cathode between conducting leads 5 and 6 passes not only through the conducting shell of the body 1 but also through the emitting material as well as the plug. The various substances become heated upon the application of a suitable current whereby a copious supply of electrons is emitted from surface 4. The cathode is heated not only by the resistance heating of the current passing therethrough but also by the heat conduction and radiation from leads 5 and 6. Heat is conserved to the dispenser cathode inasmuch as the conducting leads 5 and 6 enclose a considerable portion of the dispenser cathode body as these leads diverge generally rearwardly from the emitting end of the cathode. An "oven-like" heat conserving cavity 9 is thus formed around the dispenser cathode resulting in further heating thereof. The heating is due in part to the heat radiation from the concave inner walls of conducting leads 5 and 6 falling upon the dispenser cathode body 1.

In one specific example of a cathode construction in accordance with the present invention the cathode capsule body was formed with tantalum tubing having an 0.032 inch outside diameter, an 0.019 inch inside diameter and a length of 0.110 inch. The forward end of the tube was filled with 325 mesh tantalum powder and pressed to the desired density, about 90% of theoretical, using on the order of 100,000 lbs. per square inch pressure to form plug 3. The combination was then indirectly heated to near 2500 centigrade in a good vacuum for 15 minutes in order to sinter the porous plug which had a final thickness of about 0.025 inch. The plug end of the tube, including tube and plug, was then machined to produce the tapered porous plug extending from the end of the tube. The tapering left a very small emitting area diameter of somewhat less than 0.005 inch. The cathode is shown in comparison to a centimeter scale in FIG. 1, the showings in FIGS. 2 and 3 being enlarged for the sake of clarity.

The tapering was accomplished by turning the cathode in a lathe grasping the elongated capsule and employing a fine-toothed file as a machining tool, mounted to taper off the end. The machining closes off the tapered surface producing a metallic non-porous appearance. The machining process effectively closes the pores at the plug surface except for the untouched emitting area.

An 0.060 inch long section of 0.015 inch diameter thorium wire was then placed in the remaining open end of the tube and the open end was then closed with a tantalum disc which was platinum brazed in the tube end. Alternatively, the tantalum disc may be heliarc welded to the tantalum tube. Thus the cathode body becomes a container effectively sealed except for the unmachined area 4 of the porous tantalum plug.

Half-cylindrical support conductors 5 and 6 which were 50% longer than the cathode body 1 and having the same radius of curvature were attached around the cathode body at loctions 0.020 inch away from the emitter end by spot welding. They very nearly, but not completely, surrounded the cathode at this point. These legs were 0.001 inch (1 mil) tantalum ribbon.

In operation of this example cathode, a temperature of nearly 1550° C. is achieved with about 6 amperes drawn from a one-volt source, 22. The eutectic melting temperature for the tantalum and thorium combination is at approximately 1550° C. Above this temperature, excessive melting takes place as well as excessive thorium emission. At temperatures near 1550° C. the electron emission (at zero electric field) from the emitting surface 4 is as high as 20 amperes per square centimeter. Alternatively the cathode may be operated at slightly lower temperatures with a slightly lower voltage to produce strong emission at input power levels of 2 or 3 watts or less.

Various alternatives to the above manufacture may be utilized. Instead of thorium metal, the emitting material may consist of, for example, a barium- aluminum alloy. Tungsten or rhenium ribbon may be used for the supports and may be platinum brazed or welded to a tantalum or tungsten body. The density of the sintered tantalum powder in the porous plug may be varied in the range of approximately 50% to 90% of bulk density in order to vary the rate at which electropositive metal is delivered to the emitting surface. It is therefore apparent the example is to be taken in an illustrative and not in a limiting sense.

At the temperature and power levels discussed, a porous tantalum emitter surface employed in conjunction with thorium emitting material has been found to provide an order-of-magnitude more emission than a second refractory material, i.e. tungsten. However, if it is desired to operate at temperatures higher than 1550° C., a dispenser cathode may be formed with a porous tungsten plug having an emitting surface and possibly a tungsten dispenser cathode body for containing thorium emitting material. This construction allows higher temperature operation inasmuch as the eutectic melting temperature for the thorium-tungsten combination is higher.

The improved emission characteristics of thorium on tantalum at temperatures of 1550° C. and less is believed due to a superior bond which occurs between the thorium atoms and the tantalum surface. Thorium atoms are believed bound to the substrate surface in adsorption-coupled relation through an oxygen linkage. This surface layer dipole sets up an intense electric field at the emitting surface, aiding the electrons to escape, or reducing the work function in accordance with recognized theories of thermionic emission. The effect is believed more strongly evident in the case of a monoatomic layer of thorium atoms upon the tantalum surface than upon tungsten. Tantalum readily dissolves oxygen, presumably aiding the establishment of the thorium-oxygen surface dipole. Another advantage of employing tantalum is its ready availability in the form of tubing and the fact that it is readily machinable.

Figure 4:
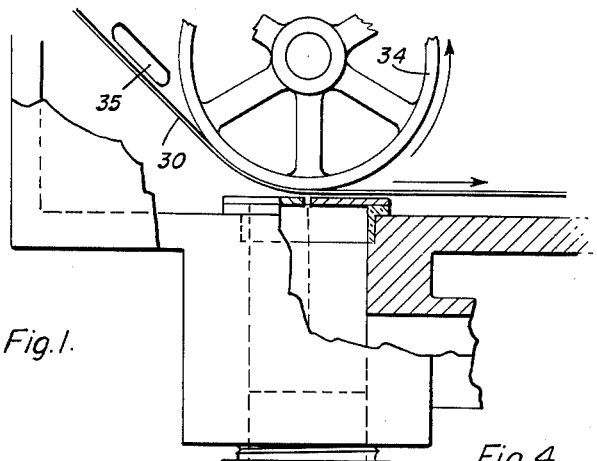
FIG. 4 is a partial cutaway plan view of an electron beam charge writing apparatus.

In FIG. 4 there is illustrated a dispenser cathode in accordance with the present invention embodied in an electron beam writing apparatus. A small dimensioned electron beam from the cathode "writes" upon thermoplastic material and the like, to thereby form diffraction phase gratings in the thermoplastic material corresponding to intelligence transmitted by the electron beam. Since the electron beam effectively writes diffraction grating lines which are only microns wide, it is desirable the electron beam be as small in cross-section as possible where it contacts the thermoplastic material. It should be on the order of four microns across. Hence, the generation of a small electron beam becomes important in such apparatus.

Referring to FIG. 4, the small dispenser cathode, as hereinbefore set out, including a body 1, a forward emitting area 4, and supporting conductors 5 and 6, is mounted in the electron gun assembly 24 housed in an evacuated chamber. An anode electrode 25 having a small hole 26 through which the electron beam 32 passes serves as a means for accelerating the electron beam. Focusing coil 28 aids the convergence of the electron beam. The electron beam 32 is normally continuously deflected transversely across a thermoplastic tape 30 by means of deflection coil 31. As the tape is moved longitudinally of itself on cylinder 34, a television type "raster" is established on the tape. Input information signals modulate the velocity of the deflection of the electron beam across the tape, and to this end such signals are connected to auxiliary deflection means comprising two transverse deflection plates 27. These electrodes operate to momentarily slow, speed, and even halt the transverse deflection of the electron beam between the plates 27, producing a varying charge density where the beam traverses thermoplastic tape 30. The tape is heated by heating means 35 so the electric charges deposited by the electron beam may deform the surface material of the tape, providing diffraction grating lines longitudinally of the tape corresponding to the input information. Various deformable oils which ordinarily do not require heating may be substituted as a light modulating medium in place of thermoplastic tape, for example as set forth in the patent to William E. Glenn, Jr., 2,943,147, issued June 28, 1960, and assigned to the assignee of the present invention.

The recording medium of the present embodiment in the form of tape 30 includes a base having a thermoplastic surface layer, oriented in the direction of the writing electron beam 32. One suitable material for the base is an optical grade of polyethylene terephthalate, sold under the name, Cronar. The thermoplastic surface layer may conveniently comprise a blend of polystyrene m-terephenyl and a copolymer of 95 weight percent butadiene and 5 weight percent styrene. Specifically the composition may be 70% polystyrene, 28% terephenyl and 2% of the copolymer. The thickness of the thermoplastic layer may vary from 0.01 mil to several mils with the preferred thickness being equal to or less than the distance between depressions in the film. For recording television pictures and with a grating line spacing of approximately 16 microns, the thickness of the thermoplastic layer may be between 6 and 15 microns or in terms of mils, 0.25 and 0.6 mil, for example.

The foregoing general system of recording with an electron beam as set forth in connection with FIG. 4, as well as the recording material and apparatus, are more fully described and claimed in the copending application of William E. Glenn, Jr., Serial Number 8,842, filed February 15, 1960 (now Patent No. 3,113,179, granted December 3, 1963), being a continuation-in-part of William E. Glenn, Jr. application Serial Number 698,167, filed November 27, 1957 (now abandoned), and of William E. Glenn, Jr., application Serial Number 783,584, filed December 29, 1958 (now abandoned), all of these applications being assigned to the assignee of the present invention.

The tape recording medium 30 employed in the FIG. 4 apparatus, as well as other similar materials, e.g. certain recording oils as set forth in the aforementioned Glenn patent, 2,943,147, capable of receiving written impressions from an electron beam, have the property of evolving carbonaceous vapor especially when heated as with heating element 35 and subjected to electron bombardment. Thorium has the property of forming carbides therewith which are good thermionic emitters. Thus the preferred cathode containing thorium can tolerate a low background pressure of hydrocarbon vapors.

It is thus clear that a dispenser cathode for small electron beam forming apparatus is provided which cathode has a long lifetime due to the copious supply of emitting material therein. It is possible to attain high current density from an almost arbitrarily small emitting area producing a small but concentrated electron beam. Power expenditure is on the order of from 2 to 5 watts giving zero field current densities of more than 10 amperes per square centimeter in vacuum. The cathode is miniaturized for the production of such a beam and is directly heated by heater current passing therethrough rather than being encumbered with a heater coil which would render difficult the practical realization of such a small cathode.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. A dispenser cathode comprising a metal body including a recess, a quantity of emitting material in said recess, means providing for egress of said emitting material to the exterior of said body, and a pair of current conducting heating leads secured to said body for carrying current through said body and shaped to confine to said body the heat generated in said body and to apply to said body the heat generated in said conductors.

2. A dispenser cathode comprising an elongated metal container having a recess, a quantity of emitting material in said recess, a porous element closing one end of said elongated metal container and extending to said recess providing egress of said emitting material, and a pair of conductive supporting skirts for said elongated metal container secured to side areas on said container near the emitting end thereof and extending generally rearward of the emitting end, said skirts being laterally dimensioned to a width comparable to the width of said container and having a contour substantially surrounding at least a portion of said elongated metal container in heat conservation relationship thereto.

3. A dispenser cathode comprising a cylindrical metal container having a recess, emitting material in said recess, porous means closing one end of said container while communicating to said recess for providing egress of said emitting material to form an electron emitting surface layer on said means, a pair of conductive supports for said container secured to said container near the emitting end thereof, said supports being concavely curved at least partially around said container where they are joined thereto, said supports extending along said container away from the emitting end and diverging from said container to provide a heat conserving cavity around said container.

4. The dispenser cathode as set forth in claim 3 wherein said metal container is tantalum, said porous means is porous tantalum, said electron emitting material is thorium, and said supporting conductors are formed of tantalum ribbon.

5. The dispenser cathode as set forth in claim 3 wherein said porous means is tapered to a small porous forward emitting area surrounded by a tapered machined area having a surface porosity substantially less than said emitting area.

6. A dispenser cathode for producing a minute electron beam comprising an elongated hollow metallic capsule having a deposit of electron emissive material enclosed therein, said capsule being impervious to emissions from said deposit except through a previous area at one end thereof of dimensions comparable to the beam to be produced, and heating conductors connected to different points of said capsule to pass current through the capsule to heat the capsule and deposit, said different points being near the end of the capsule having said pervious area and said conductors extending along the length of said capsule and having cross-sectional area shaped to confine to the capsule heat generated in the capsule and to apply to the capsule heat generated in said conductors.

References Cited by the Examiner
UNITED STATES PATENTS

| | | | |
|---|---|---|---|
| 2,677,778 | 5/1954 | Baker et al. | 313—345 |
| 2,761,993 | 9/1956 | Katz et al. | 313—346 X |
| 2,774,916 | 12/1956 | Katz | 313—346 X |
| 2,798,182 | 7/1957 | Costa | 313—346 X |
| 3,016,472 | 1/1962 | Coppola | 313—346 |
| 3,113,179 | 12/1963 | Glenn | 178—6.6 |

OTHER REFERENCES

Beck: "High-Current-Density Thermionic Emitter: A Survey," The Institution of Electrical Engineers, Paper No. 275OR, published November 1958, page 378 relied on.

JOHN W. HUCKERT, *Primary Examiner.*

JAMES D. KALLAM, *Examiner.*

A. S. KATZ, D. O. KRAFT, *Assistant Examiners.*